Sept. 9, 1952 J. W. DANIELS 2,609,951
SELF-LOADING AND SELF-DUMPING VEHICLE
Filed Aug. 19, 1949 6 Sheets-Sheet 1

Fig. 1.

Inventor
James W. Daniels
Cameron, Kerkam-Sutton
Attorneys

Sept. 9, 1952            J. W. DANIELS            2,609,951

SELF-LOADING AND SELF-DUMPING VEHICLE

Filed Aug. 19, 1949            6 Sheets-Sheet 3

INVENTOR.

James W. Daniels
Cameron, Kerkam & Sutton
Attorneys

Sept. 9, 1952  J. W. DANIELS  2,609,951
SELF-LOADING AND SELF-DUMPING VEHICLE
Filed Aug. 19, 1949  6 Sheets-Sheet 4

INVENTOR.
James W. Daniels
BY
Cameron, Kerkam & Sutton
Attorneys

Sept. 9, 1952  J. W. DANIELS  2,609,951
SELF-LOADING AND SELF-DUMPING VEHICLE
Filed Aug. 19, 1949  6 Sheets-Sheet 5

INVENTOR.
James W. Daniels
BY
Cameron, Kerkam v Sutton
Attorneys

Patented Sept. 9, 1952

2,609,951

UNITED STATES PATENT OFFICE 2,609,951

SELF-LOADING AND SELF-DUMPING VEHICLE

James W. Daniels, Fort Myers, Fla.

Application August 19, 1949, Serial No. 111,201

21 Claims. (Cl. 214—78)

This invention relates to self-loading and self-dumping vehicles having power operated means for digging or excavating bulk material from the ground and loading it into the vehicle and for dumping the material from the vehicle.

It has been proposed heretofore to provide vehicles such as auto trucks with various types of loading equipment, and in particular with grab buckets of the clam-shell type operated from swinging booms, derricks or cranes that are pivotally mounted on the vehicle body so that the grab bucket can be swung out horizontally and dropped at one side of the body, closed and elevated, and then swung back over the vehicle body and dumped therein. However, the multiplicity of controls and the complicated mechanism required for such operations have made the vehicle too expensive in the first place and also difficult to operate, and have involved a permanent installation which interferes with the use of the truck for other purposes.

One of the objects of the present invention is to provide loading equipment of the grab bucket type that is simple and inexpensive and that can be mounted readily on or demounted readily from the body of a dump truck or like vehicle so that the truck can be used either with or without the loading equipment and for any desired purpose.

Another object is to provide loading means of the above type in which the loading operation takes place automatically until the truck body is filled.

Another object is to eliminate the use of horizontally swinging booms or cranes in connection with such loading equipment.

A further object is to utilize a single hoist drum and cable for the dual purpose of closing the grab bucket and of elevating the filled bucket to dump its contents into the vehicle body.

A still further object is to utilize the same power hoist and cable for dumping the vehicle body and also for operating the grab bucket without changing the connections of the cable.

Another object is to provide novel controls for the bucket operating means that are actuated automatically in accordance with movements of the bucket between digging position and dumping position.

Other objects of the invention will appear hereinafter as the description of the invention proceeds.

One embodiment of the invention has been illustrated in the accompanying drawings, but it is to be understood that said drawings are for purposes of illustration only and are not to be construed as a definition of the limits of the invention, reference being had to the appended claims for this purpose.

The truck itself may be of any suitable type, and as shown for purposes of example, it comprises a chassis or frame indicated generally at 1, a driver's cab 2, and the usual driving means comprising an internal combustion engine 3, clutch housing 4, transmission case 5, universal joint 6, drive shaft 7 and differential housing 8 for driving the rear wheels 9. It will be understood that the foregoing elements may be of any conventional type. The dump body 10 is carried by a supporting underframe comprising longitudinal and transverse frame members 11 and 12, respectively, and is mounted on the truck for tilting movement to the dumping position shown in Fig. 3 in any suitable manner, as by means of pivot brackets 13 secured to the chassis 1 and a pivot shaft 14 carried by the dump body and rotatable in the brackets 13.

Figure 1:
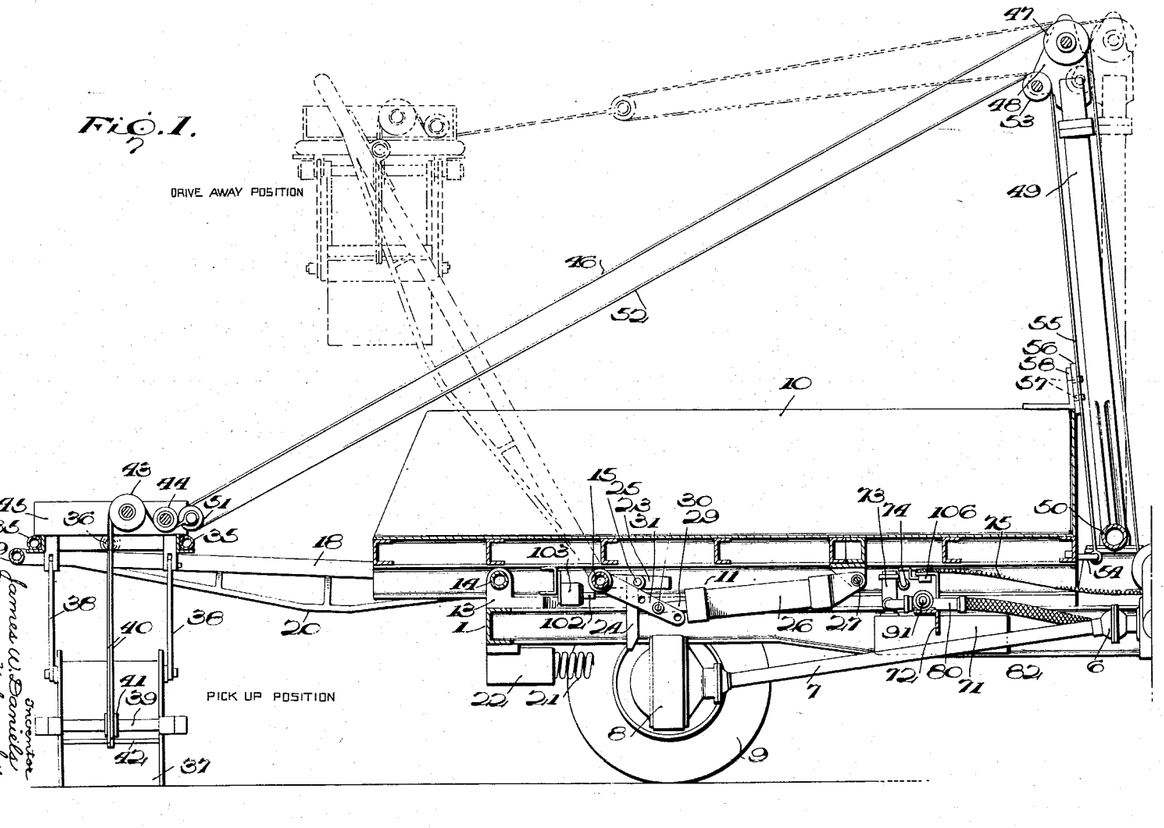
Fig. 1 is a side view, partly in section, showing a dump truck body and loading apparatus embodying the invention with the bucket in digging position.
Figure 5:
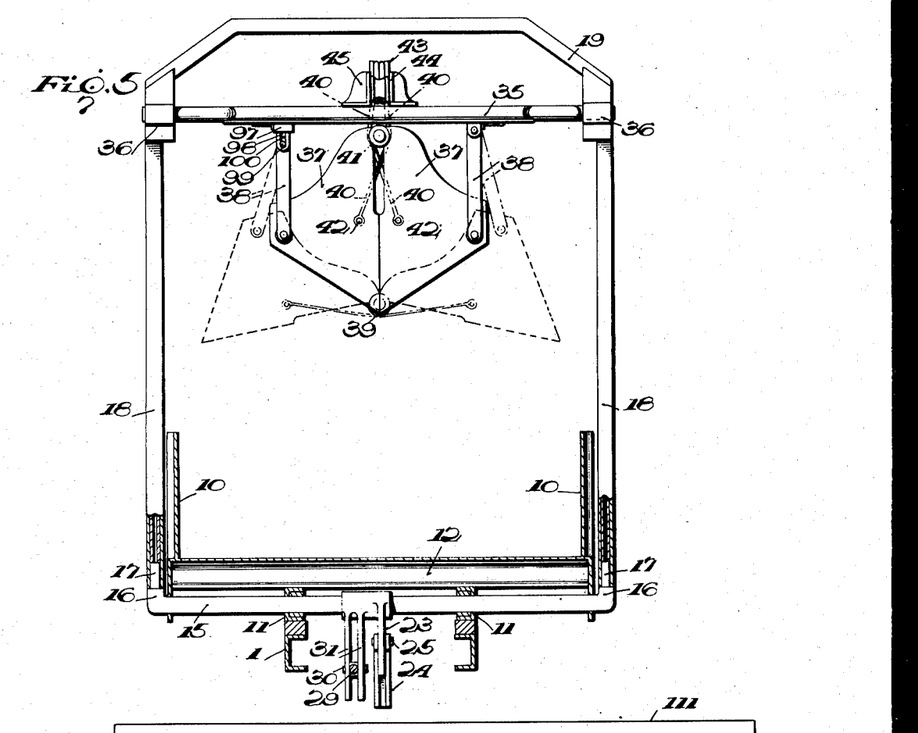
Fig. 5 is a detail of the bucket and its carrier frame.

The grab bucket is carried by a demountable carrier frame that is pivoted on the truck to swing back and forth in a vertical plane between a digging position near the ground at one side of the dump body and a dumping position over the dump body. Preferably this frame is pivoted on the dump body and moves therewith to the tilted dumping position shown in Fig. 3, so as not to interfere with the tilting of the body or the dumping of its load, and the carrier axis is transverse to the dump body and located adjacent its rear end so that the digging position of the bucket is at the rear of the vehicle (Fig. 1). In the form shown, a carrier rock shaft 15 extends transversely under the dump body through suitable bearings on its frame 11, 12, the ends 16 of the shaft being turned at right angles and terminating in extensions 17 of reduced diameter (Fig. 5). The carrier frame is generally U-shaped, comprising side members 18 the lower ends of which are hollow to telescope over the extensions 17, and the upper ends of which are connected by a cross piece 19. The sides of the carrier frame can be strengthened if necessary by suitable trusses 20.

Figures 2, 6:
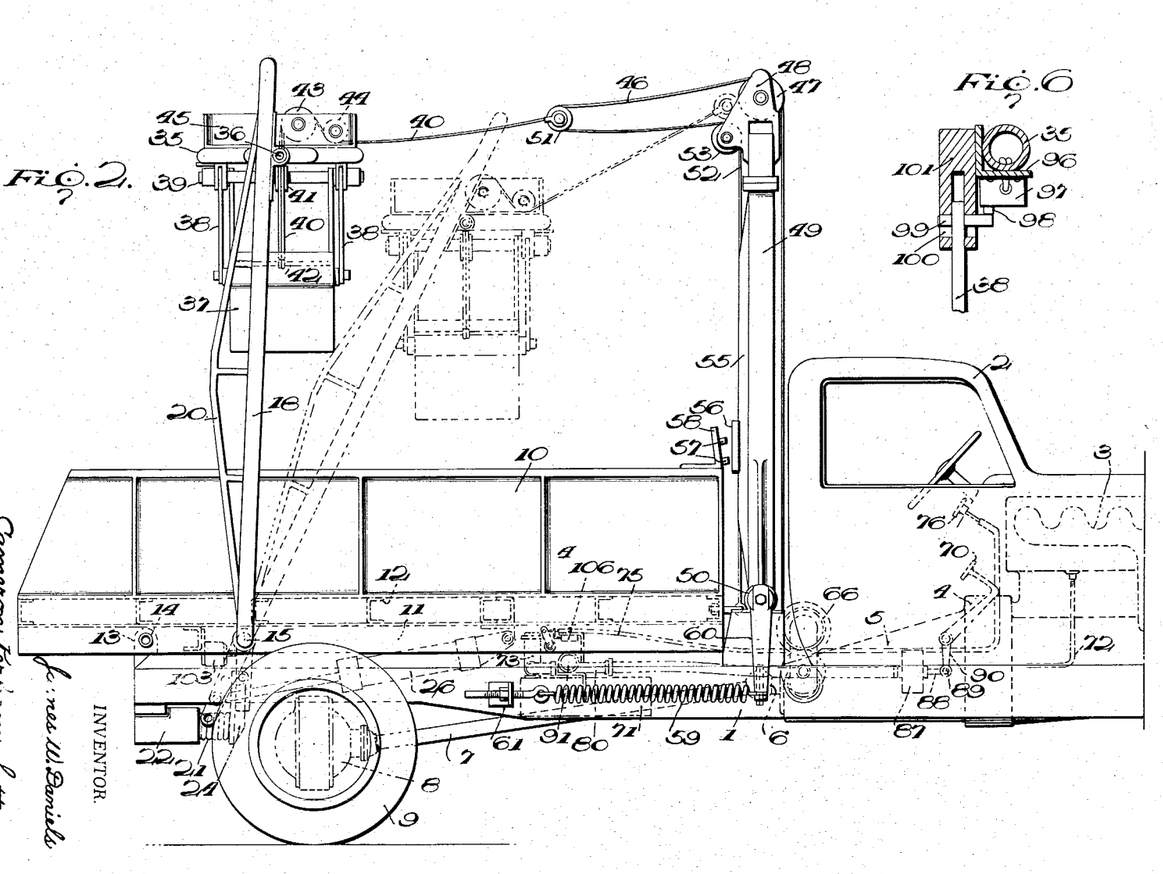
Fig. 2 is a side view showing the bucket in dumping position.
Fig. 6 is a detail of a bucket-operated electric switch.

The carrier tends to swing downwardly and rearwardly by its own weight to the approximately horizontal digging position shown in Fig. 1 in which the grab bucket carried thereby is dropped on the material to be loaded into the vehicle. The bucket is then closed and filled and the carrier is then swung upwardly as hereinafter described to an approximately vertical dumping position as shown in Fig. 2. As the carrier approaches this position, it preferably engages suitable means which cushion and retard its final movement until the bucket has been dumped. For automatic operation, moreover, means are provided to start the return movement of the carrier and to swing it back past the vertical position far enough to insure that it will be carried downwardly by its own weight to the digging position. In the form shown, both of these objects are accomplished by a compression spring 21 mounted in a casing 22 that is secured to the chassis 1 in a position such that the spring is engaged and compressed by an arm 23 on the carrier rock shaft 15. In case the swinging movement of the arm 23 should conflict with the differential housing 8, the arm itself can be shortened and provided with an extension 24 pivoted thereon at 25. When the carrier approaches dumping position, the extension drops in front of and contacts the end of the spring 21 after which the arm and the extension straighten into line with each other as shown in Fig. 2 and compress the spring.

Preferably the downward swinging movement of the carrier is also cushioned and retarded by suitable means which, in the form shown, comprise a hydraulic cylinder 26 pivoted at one end 27 on the tilting dump body, a piston 28 movable in the cylinder (Fig. 10), and a piston rod 29 extending out of the other end of the cylinder and pivoted at 30 between clevis arms 31 secured to the carrier rock shaft 15. As the carrier descends, therefore, the piston rod 29 and the piston 28 are moved into the cylinder, the liquid therein passing through a small bleed passage 32 in the piston to retard and cushion the descending movement. Meanwhile a larger piston passage 33 is maintained closed by a suitable check valve such as the ball 34. However, when the carrier and the filled bucket thereon are being swung upwardly toward dumping position, the piston moves in the cylinder in the opposite direction and the check valve 34 opens to permit relatively free passage of oil therethrough so that the upward swinging movement is not hindered.

The grab bucket itself is of the clam-shell type and typically comprises two parts pivotally connected together so that the bucket can be closed by elevating the pivot axis and vice versa. The two parts of the bucket are suspended from the carrier in such a way that the bucket hangs vertically therefrom while the carrier itself swings through an arc of approximately 90° between digging position and dumping position. In the form shown, a bucket frame 35 has its ends pivotally mounted in bearings 36 on the side frame members 18 of the carrier, the axis of these bearings being substantially at right angles to the plane of swinging movement of the carrier. The two parts 37 of the bucket itself are suspended from the bucket frame 35 by pairs of links 38 and are connected to each other by means of a common pivot shaft 39. The bucket hangs in the open position shown in dotted lines in Fig. 5 as the carrier swings downwardly and rearwardly to the digging position shown in Fig. 1 and the bucket is dropped on the material to be excavated. The bucket is then closed through the material and filled by elevating the common pivot shaft 39, preferably by means of two cables 40 passing around pulleys 41 on the pivot shaft and thence to brace bars 42 to which the ends of the cables are connected.

The cables 40 pass upwardly from the pulleys 41 over a pulley 43 and under a pulley 44, the pulleys 43 and 44 being mounted between supports 45 bridging the sides of the bucket frame 35. Thus it will be seen that a continuous pull on the ends of the cables 40 first closes the bucket and elevates its pivot shaft 39 up to the frame 35 while the bucket is in the digging position shown in Fig. 1 and thereafter swings the carrier 18 and the filled bucket upwardly and forwardly to the dumping position shown in Fig. 2. The tendency of the bucket frame 35 to tilt in its bearings 36 due to the pull of the cables 40 around the pulley 43 is compensated by the opposite effect of the pull of these cables around the pulley 44, so that the frame remains approximately horizontal while the bucket is being closed and filled.

The cables 40 are pulled to close the bucket and swing the carrier upwardly by means of a cable 46 which runs over a pulley 47 mounted between brackets 48 at the top of an upright mast 49 located at the forward end of the dump body 10, the cable 46 running down the front of the mast to a power hoisting mechanism to be described hereinafter. When the same cable 46 and mast 49 are to be used to tilt the dump body 10 to the dumping position shown in Fig. 3, the mast 49 is preferably mounted to tilt on a transverse horizontal axis 50 so that a shorter mast can be used to obtain the maximum elevation of the front end of the dump body. It will be seen that the cable 46 can be connected to the cables 40 for the purpose of closing the bucket and swinging the carrier, and then disconnected therefrom and connected to the forward end of the dump body for the purpose of tilting it to dumping position. In order to avoid changing the connections of the cable, however, it preferably runs around a traveling block 51 to which the ends of the cables 40 are connected, the lower reach 52 of the cable 46 running over a pulley 53 also mounted between the brackets 48 at the top of the mast and thence down the front of the mast to an eye 54 at the lower front end of the dump body 10.

Figures 3, 10:
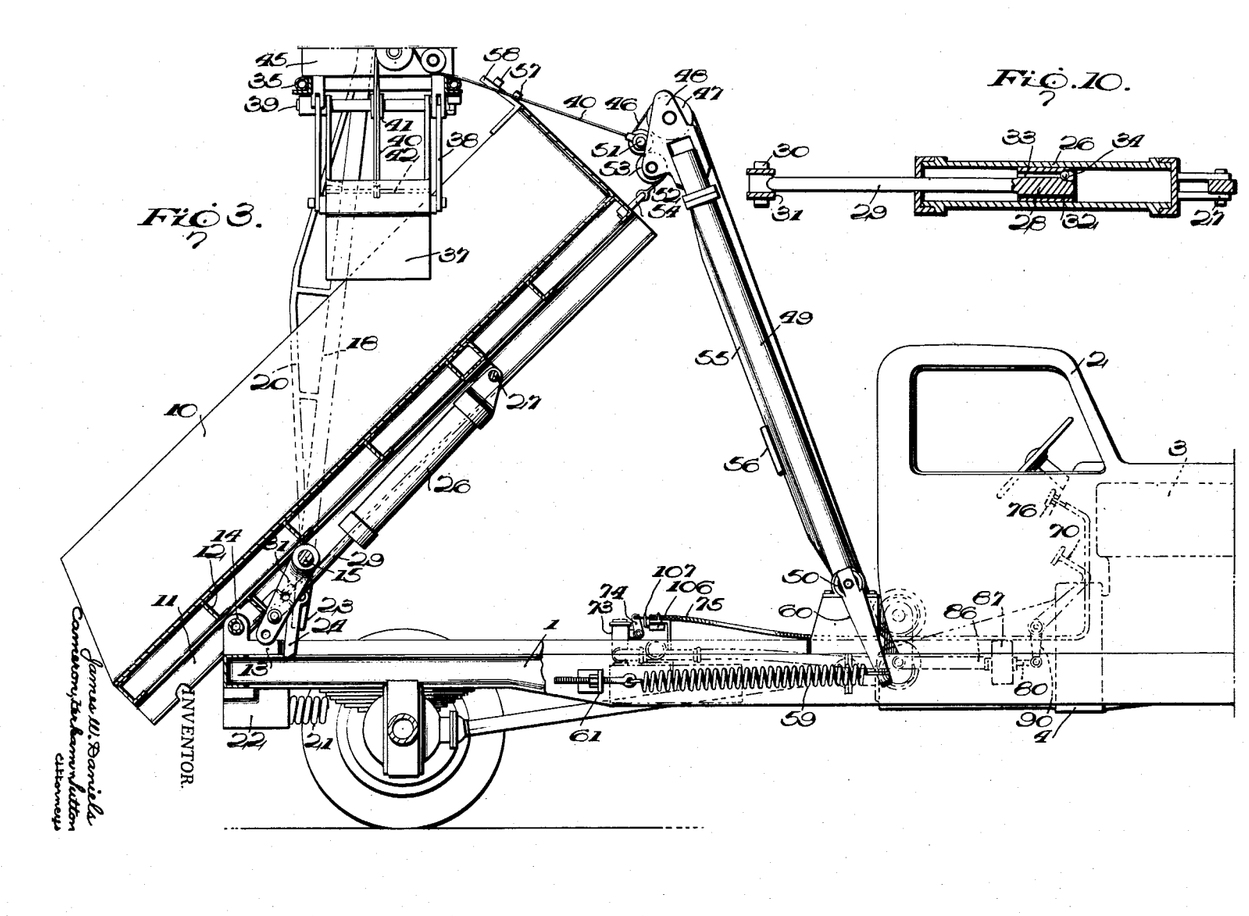
Fig. 3 is a side view showing the dump body of the truck tilted to dumping position.
Fig. 10 shows a hydraulic cushioning device for the bucket carrier.

In closing the bucket in digging position, the traveling block 51 is pulled away from the bucket frame to the extent shown in Fig. 2, which condition is thereafter maintained as the carrier and the closed and filled bucket swing upwardly to dumping position. Meanwhile the mast 49 tilts rearwardly about its axis 50 to engage against the front end of the dump body 10, and suitable interlocking means are provided to prevent lifting the front end of the dump body. In the form shown, the reach of the cable which extends down the rear slide of the mast to the eye 54 passes between cable guides 55. Plates or brackets 56 are secured to these guides and are provided with holes arranged to be engaged by pins 57 on a head board 58 on the vehicle body as illustrated in Fig. 1. Since the dump body is thus locked against tilting movement, the pull of the cable 46 is effective only to close the bucket and swing the carrier and filled bucket therewith to dumping position. However, the carrier can be pulled forwardly beyond dumping position until the traveling block 51 moves into engagement with the brackets 48 at the top of the mast as shown in dotted lines in Fig. 2. Since the pull of the cable at this time is only that required to compress the spring 21, the mast is also brought to an upright position by suitable resilient means such as tension springs 59 interposed between the ends of arms 60 on the pivot shaft 50 of the mast and brackets 61 on the vehicle chassis. Thus the pins 57 are disengaged from the brackets 56, and since the traveling block 51 now becomes in effect a fixed pulley, the cable travels up the forward side of the mast, through the pulley system 47, 51 and 53, and down the rear side of the mast to the eye 54. Continued pull on the cable is therefore effective only to elevate the front end of the dump body 10, and as the tilting movement of the dump body proceeds, the mast 49 again tilts rearwardly as illustrated in Fig. 3 until the dump body reaches its fully tilted position and its contents are discharged.

The cable 46 is operated by a suitable power hoist or winch which is driven by the engine 3 in any suitable manner, preferably through gearing in the transmission 5 which is shiftable so that the hoist can be driven ahead or in reverse or placed in neutral. Power takeoffs of this type are well known in the art and their details are not illustrated herein. Hence the cable can be slacked off and hauled in under the control of the driver to operate the bucket, carrier, and dump body as described above. For automatic loading, however, the power hoist is also equipped with an automatically operating clutch actuated in response to swinging movement of the carrier and bucket to release the hoist drum and the cable in dumping position and to re-engage the drum and cable with the power drive in digging position. Such a system can be operated either automatically or under the control of the truck driver by means of automatic clutch controls adapted to be cut in or out at the will of the driver, as illustrated by the following description.

Figure 4:
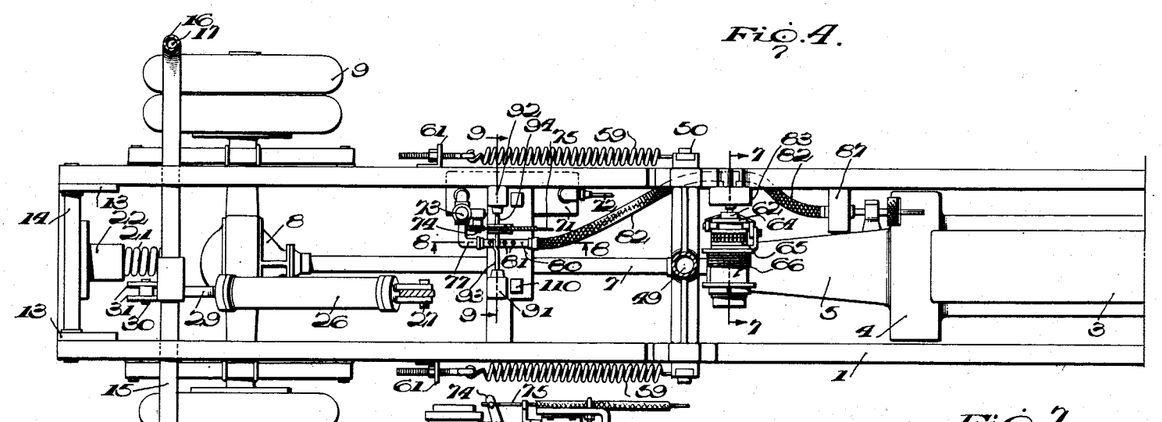
Fig. 4 is a plan view of the chassis of the truck, with the dump body removed.
Figures 7, 8, 9:
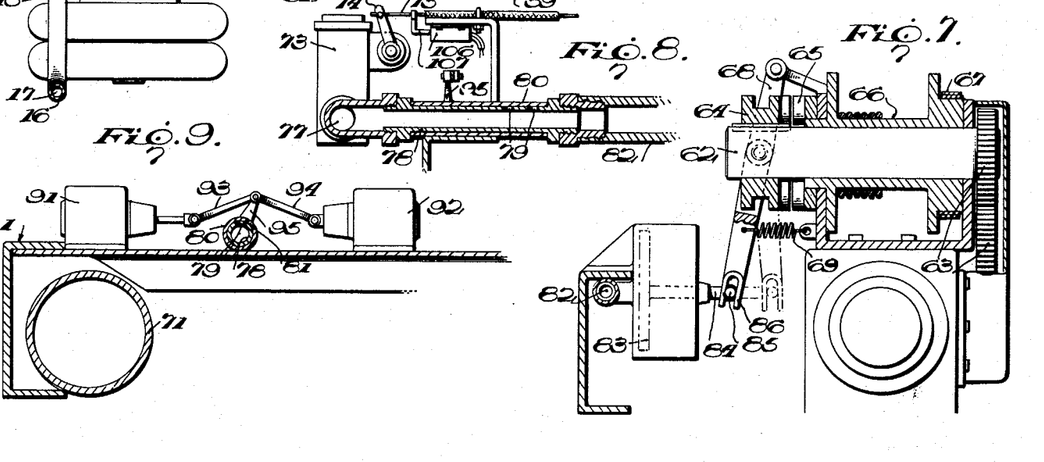
Figs. 7, 8 and 9 are detail views on the lines 7—7, 8—8 and 9—9 of Fig. 4.

Figs. 4 and 7 show by way of example a power hoist or winch comprising a shaft 62 that is driven by gearing 63 from a power takeoff of the known type mentioned above. A jaw clutch member 64 is keyed to slide longitudinally on the shaft 62 and to engage a cooperating jaw clutch member 65 connected to the winding drum 66 whereby the cable 46 is operated. The drum may be provided with any suitable type of brake 67 to hold it against rotation on the shaft 62 whenever desired. The jaw clutch members 64 and 65 are normally urged into engagement by means of a suitable shifting fork 68 and spring 69. Thus it will be seen that the cable 46 can be controlled by the driver in the cab of the truck by shifting the transmission gearing and operating the usual clutch pedal 70.

For automatic control of the cable 46, suitable means are provided for disengaging the clutch 64, 65 and releasing the cable 46 and the winding drum 66 when the filled bucket reaches dumping position, and for re-engaging the clutch to drive the drum 66 and haul in the cable 46 when the bucket again reaches digging position. In the form shown, these automatic controls comprise a vacuum system connected to the intake manifold of the engine 3, and an electromagnetically operated valve control for the vacuum system. A vacuum tank 71 is mounted on the vehicle chassis and is connected to the intake manifold by the line 72. The tank is also connected to a master valve 73 operated by a handle 74 and a wire or cable 75 extending to a button 76 on the dashboard of the cab. The master valve 73 is coupled through an elbow 77 with a straight section of pipe 78 having vacuum relief openings 79 therein which are opened or closed according to the position of a surrounding rotatable sleeve 80 having corresponding openings 81. The other end of the pipe section 78 is connected by a vacuum hose 82 with a diaphragm unit 83, the rod 84 of which has a pin 85 engaging a fork 86 in the end of the shifting member 68 so that the vacuum tends to disengage the jaw clutch member 64, 65 in opposition to the spring 69. A branch of the hose 82 leads to a second diaphragm unit 87, the rod 88 of which is pivoted at 89 to an extension 90 of the clutch pedal 70, so that the application of vacuum also tends to depress the clutch pedal and to disengage the drive from the engine to the transmission.

The application of vacuum to the diaphragm units 83 and 87 thus depends on the position of the rotary sleeve 80 which controls the vacuum relief openings 79 mentioned above, which rotary sleeve is actuated in response to swinging movements of the carrier to digging and dumping positions. Preferably this actuation is accomplished by electromagnetic means such as the solenoids 91 and 92 which are connected by links 93 and 94 respectively with a rock arm 95 secured to the rotary sleeve 80. The solenoids 91 and 92 are in turn controlled by switches actuated in response to swinging movement of the carrier. The engagement of the empty bucket with the material to be excavated is preferred to control the solenoid 91, and Fig. 6 shows a switch mechanism that can be used for this purpose. A bracket 96 is secured to the bucket frame 35 in any suitable manner as by welding, and carries a suitable switch 97 adapted to be closed by actuation of a protruding switch button 98. The bucket supporting link 39 has a pin 99 that is slidable vertically in a slot 100 in a bracket 101 secured to the bracket 96. When the bucket drops on the ground, the pin 99 is momentarily forced upwardly in the slot 100 to actuate the switch button 98 and close the switch 97 which in turn energizes the solenoid 91 and moves the sleeve 80 counter-clockwise from the position shown in Fig. 9 to bring the openings 81 of the sleeve into registry with the openings 79 of the stationary part 78 and thus to break the vacuum. Accordingly the spring 69 is effective to engage the jaw clutch 64, 65 and the winding drum 66 is driven by the engine to haul in the cable 46, close the bucket and swing the carrier as described above. As a precaution, two or more switches 97 can be provided for actuation by different links 39.

When the carrier and filled bucket thereon swing to dumping position as shown in Fig. 2, on the other hand, the arms 31 on the carrier rock shaft 15 engage the operating member 102 of a switch 103 which energizes the solenoid 92 and moves the sleeve member 80 to the position shown in Fig. 9 in which the valve openings are no longer in registry so that vacuum is applied to the diaphragms 83 and 87. This has the effect of disconnecting the winding drum 66 and releasing cable 46 to dump the bucket and to allow the carrier and the empty bucket to return to digging position as described above. The second diaphragm 87 which operates the clutch pedal is not necessary in all cases, but is preferred when the driving clutch of the hoisting drum is of the jaw type, which is generally the case in order to insure a positive drive. In such cases the pull of the vacuum may not be effective to disengage the jaw clutch parts while under strain. However, the operation of the clutch pedal disconnects the drive from the engine to the clutch part 64, and as the carrier reaches its approximate vertical position, the springs 59 jerk the mast 49 upright and pull the carrier forwardly past the vertical position, thereby creating momentary slack in the cable 46. Thus at this instant all strain on the clutch jaws 64, 65 is removed and they are free to disengage under the pull of the vacuum diaphragm 83.

Figure 11:
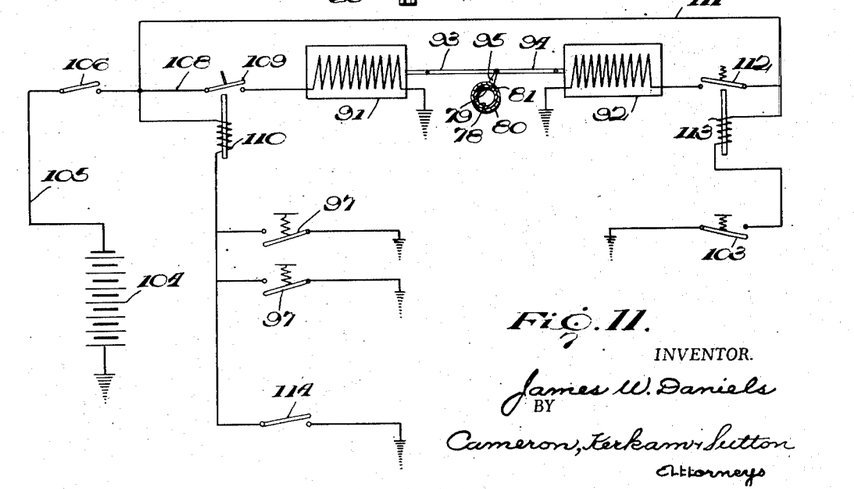
Fig. 11 is a wiring diagram of the operating controls.

Fig. 11 shows a suitable wiring diagram. The circuit is energized from the battery 104 from which a wire 105 leads to a master switch 106 controlled by an arm 107 on the wire 75, so that the master valve 73 and the master switch 106 are operated simultaneously from the button 76 on the dashboard. Solenoid 91 is energized through a wire 108 and a switch 109 operated by a relay 110. Solenoid 92 is similarly energized through a wire 111 and a switch 112 operated by a relay 113. The relay 110 is controlled by the bucket switches 97, and the relay 113 is controlled by the switch 103. In case the bucket switches 97 are not closed for any reason, an auxiliary switch 114 may be located in the cab for actuation by the driver.

The operation and use of the apparatus may be described briefly as follows. As the truck drives to the point at which it is to be loaded, the carrier is preferably held by the cable 46 in the dotted line position shown in Fig. 1, the brake 67 being used to hold the winding drum 66 if necessary. The driver backs the truck up to the pile of material to be loaded, cuts in the power takeoff, and operates the button 76 to open the master valve 73 and close the master switch 106. The carrier with the closed empty bucket thereon swings forwardly to dumping position at which the switch 103 is actuated and the clutch 64, 65 is disengaged. The bucket then falls open and the carrier and empty bucket swing back by virtue of the spring 21 and their own weight until the open bucket strikes the material to be excavated in digging position. At this time one of the switches 97 is actuated to break the vacuum, whereupon the clutch 64, 65 re-engages and the drum 66 starts to haul in the cable 46. The bucket is first closed, picking up a load, after which the carrier and the filled bucket are swung back upwardly to dumping position. This cycle of operations continues automatically until the dump body 10 is filled. As the last bucket load swings upwardly toward dumping position, the driver again operates the button 76 to close the master valve and open the master switch. The clutch 64, 65 remains in engagement, however, and the carrier continues to swing upwardly to dumping position under the sole control of the clutch pedal. When the desired dumping point has been reached, the driver depresses the clutch pedal, reverses the power takeoff, and then releases the clutch pedal and slacks off the cable rapidly to dump the bucket. The carrier and the empty open bucket then start to swing back toward digging position, taking up the slack in the cable 46 as rapidly as it is paid out by operation of the winding drum, until they reach a suitable transporting position such as that illustrated on dotted lines in Fig. 1. The driver then re-establishes the normal drive from the engine to the wheels and drives away with the load to any desired point where the material is to be dumped.

When the dumping point has been reached, the driver again cuts in the power takeoff in the hoisting direction and pulls the traveling block 51 up to the position shown in dotted lines in Fig. 2. Continued winding of the cable then lifts the front end of the dump body 10 to the dumping position shown in Fig. 3 and its contents are discharged. The power takeoff is then reversed to lower the dump body 10 to its normal position and the reverse operation of the drum is continued to permit the carrier and the bucket to swing back to the desired transporting position.

It should be further noted that distribution of the load throughout the length of the dump body 10 can be controlled by the driver through regulation of the speed of the engine. By depressing the accelerator pedal and speeding up the engine, the carrier swings upward very rapidly and this effect, together with the effect of the springs 59, causes the carrier to swing substantially past the vertical before the contents of the bucket are dumped. If the engine is operated slowly, on the other hand, the bucket will dump its contents substantially in the position shown in Fig. 2.

It will also be evident that if desired, the driver can operate the apparatus without cutting in the automatic controls.

The loading apparatus can be removed simply by disconnecting the cables 40 from the traveling block 51 and lifting the carrier and bucket from the extension 17 of the rock shaft. The cable 46 is then wound up until the block 51 reaches the position shown in dotted line in Fig. 2 and the truck becomes an ordinary dump truck.

In some cases it may be preferable to provide adjustable means for positively limiting the forward swinging movement of the bucket carrier in various positions so that load distribution can be effected automatically and without regard to the speed of operation of the carrier as described above. Such means can be provided in the form of a hydraulic control, associated with the hydraulic cylinder 26 described above or with a similar cylinder, and adjustable by the driver so as to stop the movement of the carrier at the desired dumping point. Thus the control can be utilized by the driver to cause the bucket to dump in any one of a number of dumping positions distributed longitudinally along the dump body 10. By the addition of a pressure source such as a hydraulic pump, moreover, the hydraulic means can be utilized to swing the carrier and empty bucket back past the vertical position, thus eliminating the use of the compression spring 21.

Figures 12, 13, 14, 15, 16, 17, 18:
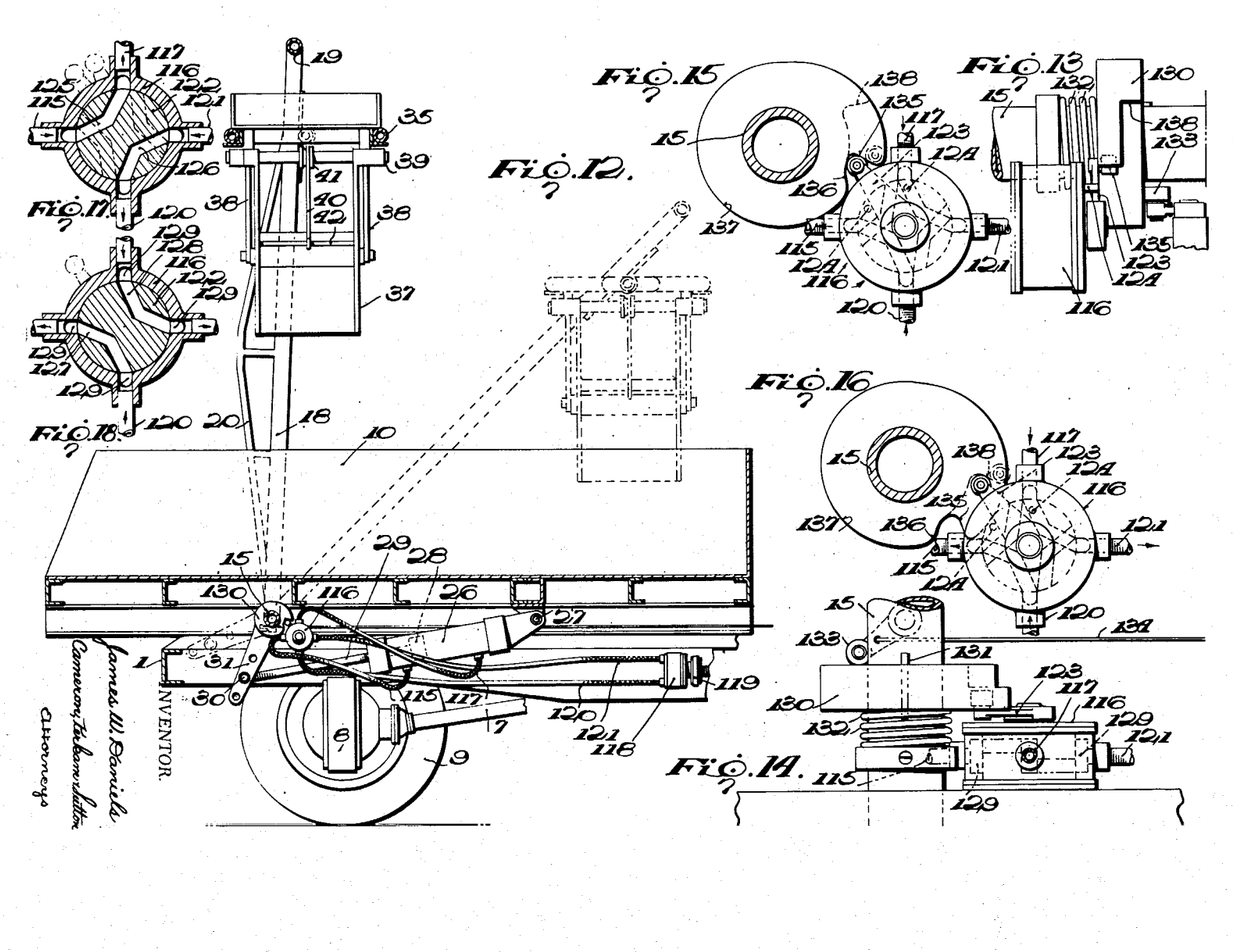
Fig. 12 is a partial side view of the truck showing a hydraulic means for adjustably controlling the dumping position of the grab bucket.
Figs. 13 and 14 are respectively side and plan views of the hydraulic control means.
Figs. 15 and 16 illustrate two different positions of the hydraulic valve and its operating means.
Figs. 17 and 18 are diagrammatic views showing a suitable arrangement of the valve passages of the control valve.

Figs. 12–18 illustrate a suitable hydraulic control embodying the above features and settable by the operator to dump the bucket in either one of two positions, an aft dumping position in which the carrier is approximately vertical as shown in full lines in Fig. 12 and a forward dumping position such as shown in dotted lines in Fig. 12. In the usual case, sufficient load distribution can be obtained without additional intermediate positions, although they can be provided if desired. As shown in these figures, the hydraulic control is associated with the cylinder 26 previously described, the dump truck, carrier frame, bucket, etc., being the same except that the spring 21 and its operating arm 23, 24 are omitted.

As the carrier and the filled bucket swing upwardly toward dumping position, the hydraulic fluid is forced out of the left-hand end of the cylinder through a pipe 115 which leads to a hydraulic control valve 116 to be described hereinafter. From the valve unit 116, a return pipe 117 leads to the right-hand end of the cylinder. A hydraulic pump 118 is driven by suitable means such as a pulley 119, the pressure side of the pump being connected to the valve unit 116 by a pipe 120 and the suction side of the pump being connected thereto by a pipe 121. The valve is provided with suitable passages so that while the carrier is swinging upwardly toward dumping position, the pump merely circulates liquid through the valve unit and the cylinder liquid is by-passed through the valve unit, there being no connection between these two systems. The passage 33 through the piston is accordingly unnecessary and is omitted. When the carrier and filled bucket reach the desired dumping position, however, a part movable with the carrier and bucket shifts the valve unit so as to close the by-pass between the ends of the cylinder and connect the pipe 120 with the pipe 115 and the pipe 121 with the pipe 116. Pump pressure is then applied to the left-hand end of the cylinder, forcing the piston 28 in the opposite direction and swinging the carrier back up to the vertical position, the liquid from the right-hand end of the cylinder meanwhile exhausting to the pump suction. Thereafter the carrier and bucket descend to digging position by their own weight, and hence the valve unit can be shifted back to its original position ready for the next operation.

Any suitable type of valve can be employed for the above purposes. In the form shown by way of example, the unit 116 comprises a casing which is mounted on the chassis 1, and a rotary valve body 122 operated by an arm 123 to shift the valve between its normal position and its carrier-stopping and returning position as described above, these positions being determined by stops 124 limiting the throw of the arm 123. The arrangement of the valve passages can be varied as desired, depending on the location of the connections to the valve unit, the throw of the valve, etc. For example, one end of the rotary valve plug may be provided with a passage 125 (Fig. 17) connecting the pipes 115 and 117 and with a similar passage 126 connecting the pipes 120 and 121 when the valve unit is in normal position. The other end of the rotary valve plug may likewise be provided (Fig. 18) with a passage 127 connecting the pipes 115 and 120 and with a similar passage 128 connecting the pipes 117 and 121 when the valve unit is in its stopping position.

The ports of the passages 125 and 126 are offset circumferentially with respect to the ports of the passages 127 and 128 by an amount equal to the throw of the valve. The pipes 115, 117, 120 and 121 each lead into an axial groove 129 in the casing 116 which is of sufficient extent to register with the ports of the valve passages at both ends of the plug.

In order to adjust the position at which the carrier is stopped and the bucket is dumped, the operator is provided with means for effecting relative adjustment between the normal position of the valve operating arm 123 and the part of the swinging carrier frame which engages the arm to shift the valve unit. Various means can be employed for this purpose, and the drawings show by way of example a double cam 130 mounted on and rotating with the carrier shaft 15 but capable of longitudinal sliding movement thereon relative to the arm 123 by virtue of a key 131. The cam is normally maintained in the position shown in Figs. 14 and 15 by means of a spring 132, but can be shifted by a pivoted lever 133 operated by a Bowden wire 134 or the like which preferably extends to a point in the cab where it is conveniently accessible to the driver.

Where only two dumping positions are desired, the cam has only two sides which may be made separately and secured together in any suitable manner. One side of the cam is formed with a notch having an approximately radial edge 135 that is adapted to engage the arm 123 and shift the valve from its normal position to the position shown in Fig. 15. The cam is set so that this engagement first takes place just as or slightly before the carrier reaches the vertical position in its upward swing. At this point the springs 59 take control of the carrier and start to swing it rapidly forward, but the shift of the valve to the position illustrated by Fig. 18 takes place simultaneously so that the carrier is brought to a stop in the dumping position shown in full lines in Fig. 12. At the same time the cable is slacked off as described above and the bucket is dumped. Meanwhile the pump pressure builds up and takes over the control of the carrier, swinging it and the empty bucket back to and preferably slightly past the vertical.

The reversal of movement of the carrier also reverses the movement of the cam 130 so that the edge 135 moves away from the valve arm 123. As the carrier reaches the desired point in its return movement, however, an incline 136 on the edge of the cam engages the arm 123 and swings it and the valve unit back to normal position in which the cylinder 26 and the pump 118 are by-passed through the passages 125 and 126 respectively as shown in Fig. 17. Thereafter the carrier and bucket continue to descend by gravity, the end of the valve arm 124 being now located outside the circumference of the cam circle 137 so that the valve is not disturbed until the edge 135 again comes into action on the next upward swing of the carrier.

When the cam is shifted by the operating member 134, the other side of the cam controls the operation of the valve unit to dump the bucket in or forward dumping position shown in dotted lines in Fig. 12. The radial edge 138 on this side of the cam (Fig. 16) is displaced circumferentially relative to the edge 135 so that the valve is not shifted to stopping position until the carrier has swung forwardly to the desired dumping position. On the return movement of the carrier, however, the valve remains shifted until the carrier has swung back to or slightly past the vertical, the location of the incline 136 being the same on both sides of the cam.

In practice, the driver can fill either the front end of the dump body first or the rear end, or can dump the bucket at will in either position simply by controlling the position of the cam by means of the operating member 134.

It will be understood that the invention is not restricted to the examples described in detail above and illustrated in the drawings but is capable of various other embodiments, and also that various changes can be made by those skilled in the art in the form, details of construction, and arrangement of the parts, all without departing from the spirit of the invention. Reference should therefore be had to the appended claims for a definition of the limits of the invention.

What is claimed is:

1. A self-loading vehicle comprising a swinging carrier pivoted on the vehicle on a transverse horizontal axis for oscillation between a digging position at the rear of the vehicle and a dumping position above the vehicle body, a grab bucket on said carrier and swingable therewith between said positions, a cable for closing said bucket in said digging position and then swinging said carrier and the filled bucket to said dumping position, a source of power and means operated thereby for hauling in said cable, control means for said power operated means comprising a vacuum-operated clutch and vacuum-controlling electromagnetically operated valve means for said clutch, and two switches for energizing said electromagnetically operated valve means, said valve means being movable to one position in which said clutch is engaged and to another position in which said clutch is disengaged, one of said switches being actuated by movement of said carrier to digging position for moving said valve means to said one position, the other switch being actuated by movement of said carrier to dumping position for moving said valve means to said other position.

2. A self-loading vehicle as defined in claim 1, including an auxiliary manually operable switch for moving said valve means to said one position.

3. A self-loading vehicle comprising a swinging carrier pivoted on the vehicles on a transverse horizontal axis for oscillation between a digging position at the rear of the vehicle and a dumping position above the vehicle body, a grab bucket on said carrier and swingable therewith between said positions, a cable for closing said bucket in said digging position and then swinging said carrier and the filled bucket to said dumping position, a source of power and means operated thereby for hauling in said cable, and control means for said power operated means comprising a vacuum-operated clutch and valve means actuated by swinging movement of said carrier to said two positions for controlling the vacuum to operate said clutch, said valve means comprising a vacuum conduit having an opening therein and a valve member movable to a position in which said opening is closed and to another position in which said opening is in communication with the atmosphere.

4. A self-loading vehicle as defined in claim 3, including electromagnetic operating means for said valve member, and two switches for energizing said electromagnetic means, one of said switches being actuated by movement of said carrier to digging position and the other by movement of said carrier to dumping position.

5. A self-loading vehicle comprising a swinging carrier pivoted on the vehicle on a horizontal axis and rotatable on said axis between a digging position near the ground and a dumping position over the vehicle body, a frame pivoted on said carrier on a horizontal axis substantially parallel to the carrier axis, a grab bucket suspended from said frame and comprising two parts pivotally connected together with their pivotal axis substantially at right angles to the frame axis, and power means on said vehicle including a cable for elevating the pivotal connection of said bucket parts to said frame to close said bucket and thereafter swinging the closed bucket and the frame and carrier upwardly to said dumping position by continuous pull on said cable, said bucket opening to dump its contents when said cable is slacked off, said frame having a support thereon, a pulley on said support, said cable running over said pulley and down to said bucket, and a second pulley on said support in line with the reach of the cable from said first pulley to said power means, said reach running under said second pulley to maintain said frame substantially horizontal as said carrier swings between said two positions.

6. A self-loading vehicle comprising a swinging carrier pivoted on the vehicle on a horizontal axis and rotatable on said axis between a digging position near the ground and a dumping position over the vehicle body, a frame pivoted on said carrier on a horizontal axis substantially parallel to the carrier axis, a grab bucket suspended from said frame and comprising two parts pivotally connected together with the axis of their pivotal connection substantially at right angles to the frame axis, power means on said vehicle including a cable for elevating the pivotal connection of said parts to said frame to close said bucket and thereafter swinging the filled bucket and the frame and carrier upwardly to said dumping position by continuous pull on said cable, said bucket opening to dump its contents when said cable is slacked off, and control means for said power means and actuated by swinging movement of said carrier to digging position for hauling in said cable and by swinging movement of said carrier to dumping position for slacking off said cable, and means for returning said carrier to digging position when said cable is slacked off.

7. A self-loading vehicle comprising a swinging carrier pivoted on the vehicle on a transverse horizontal axis for oscillation between a digging position at the rear of the vehicle and a dumping position above the vehicle body, a grab bucket on said carrier and swingable therewith between said positions, power means on said vehicle, and means operated by said power means for closing said bucket in digging position and then swinging said carrier and the filled bucket upwardly to dumping position comprising an elevated mast mounted on the vehicle forwardly of said body, a cable operated by said power means and running over the top of said mast, a traveling block connected to said bucket, a pulley on said mast, said cable running from the top of the mast around said block, back to and over said pulley, and down to the forward end of said vehicle body, and means retaining the forward end of said body against elevation during operation of said power means to load said vehicle body, said cable releasing means and said retaining means being disconnectable whereby said power means and cable may be utilized to dump said vehicle body.

8. A self-loading vehicle as defined in claim 7, said mast being pivoted to tilt rearwardly toward said vehicle body, interlocking means on said mast and body adapted to engage when said mast is tilted to retain said body against elevation, and resilient means maintaining said mast upright when said block, carrier and empty bucket are pulled forwardly to dump said vehicle body.

9. A self-loading vehicle comprising a swinging carrier pivoted on the vehicle on a transverse horizontal axis for oscillation between a digging position at the rear of the vehicle and a dumping position above the vehicle body, a grab bucket on said carrier and swingable therewith between said positions, power means on said vehicle, and means operated by said power means for closing said bucket in digging position and then swinging said carrier and the filled bucket upwardly to dumping position comprising an elevated mast pivotally mounted on said vehicle to tilt rearwardly toward said vehicle body, a cable operated by said power means and running over the top of the mast whereby the latter is tilted as said carrier and the filled bucket swing upwardly, resilient means tending to maintain said mast upright and assisting the swinging of said carrier to dumping position, means operated by swinging movement of said carrier to said dumping position for releasing said cable to dump said bucket, and resilient means engaged by said carrier as it approaches dumping position for starting the return movement of said carrier when the cable is slacked off by operation of said cable releasing means.

10. A self-loading vehicle as defined in claim 9, said cable releasing means comprising a winding drum for said cable and a clutch connecting said drum to said power means, clutch disengaging means, and an electrical control circuit for said clutch disengaging means including a switch closed by said carrier as it swings to dumping position.

11. A self-loading vehicle as defined in claim 9, including hydraulic means for cushioning the return movement of said carrier to digging position.

12. A self-loading vehicle comprising a swinging carrier pivoted on the vehicle on a transverse horizontal axis for oscillation between a digging position at the rear of the vehicle and an approximately vertical dumping position above the vehicle body, resilient means tending to return said carrier from dumping position toward digging position, a grab bucket on said carrier and swingable therewith between said positions, a mast pivoted on said vehicle to tilt rearwardly toward said carrier, a cable running over said mast and connected to said bucket, means for hauling in said cable to close said bucket in digging position and then to swing the filled bucket and carrier to dumping position, said mast tilting rearwardly under the strain of the cable, springs operative as said carrier approaches dumping position to restore said mast to upright position and pull said carrier suddenly to dumping position, thereby momentarily slacking said cable, and means for releasing said cable hauling means during the slack period of said cable whereby the bucket opens due to the weight of its load and the carrier is swung back toward digging position by said resilient means.

13. A self-loading vehicle as defined in claim 12, said releasing means comprising a clutch for driving said hauling means and means actuated by swinging movement of said carrier to dumping position for releasing said clutch.

14. A self-loading vehicle as defined in claim 13, including means actuated by swinging movement of said carrier to digging position for reengaging said clutch.

15. A self-loading vehicle as defined in claim 14, said clutch being of the jaw type and having means normally maintaining the clutch jaws in engagement, vacuum-operated means for disengaging the clutch jaws, vacuum-controlling valve means, means actuated by swinging movement of said carrier to digging position for moving said valve means to a position in which the vacuum is broken, and means actuated by swinging movement of said carrier to dumping position for moving said valve means to a position in which vacuum is applied to said vacuum-operated means.

16. A self-loading vehicle as defined in claim 15, said valve-moving means being electromagnetic and having two control switches one closed by movement of said carrier to digging position and the other by movement of said carrier to dumping position.

17. A self-loading vehicle comprising a swinging carrier pivoted on the vehicle on a transverse horizontal axis for oscillation between a digging position at the rear of the vehicle and a dumping position above the vehicle body, a grab bucket on said carrier and swingable therewith between said positions, a cable for closing said bucket in said digging position and then swinging said carrier and the filled bucket to said dumping position, source of power and means operated thereby for hauling in said cable, control means actuated by swinging movement of said carrier to said two positions for connecting said means to and disconnecting it from said source of power and thereby hauling in and slacking off said cable, and means for stopping the swinging movement of said carrier to dumping position comprising a hydraulic device having a control valve shiftable from normal position to a position in which said device opposes further swinging movement of said carrier and valve-operating means movable with said carrier for engaging and shifting said valve when the carrier reaches dumping position.

18. A self-loading vehicle as defined in claim 17, including manually settable means for adjusting the positions of said valve and valve-operating means relative to one another, thereby adjsting the point at which said carrier is stopped.

19. A self-loading vehicle as defined in claim 17, said hydraulic device comprising a cylinder and piston one of which is connected to said carrier and the other to the vehicle body, and a by-pass connecting the ends of the cylinder, said valve controlling said by-pass and being shiftable to a position in which said by-pass is closed to stop said carrier.

20. A self-loading vehicle as defined in claim 19, including means for moving said carrier back from dumping position toward digging position, and means movable with said carrier for shifting said valve to its original position at a predetermined point in the return movement of said carrier.

21. A self-loading vehicle as defined in claim 20, said means for moving said carrier back from dumping position comprising a hydraulic pump having its pressure and suction sides connected through said valve when the latter is in normal position, said valve when shifted connecting said pump with said cylinder to move said piston in carrier-returning direction.

JAMES W. DANIELS.

REFERENCES CITED

The following references are of record in the file of this patent:

UNITED STATES PATENTS

| Number | Name | Date |
|---|---|---|
| 1,256,401 | Ward | Feb. 12, 1918 |
| 1,278,855 | Church | Sept. 17, 1918 |
| 2,114,157 | Towson | Apr. 12, 1938 |
| 2,135,071 | Folberth et al. | Nov. 1, 1938 |
| 2,228,447 | Evelev | Jan. 14, 1941 |
| 2,254,083 | Nickles et al. | Aug. 26, 1941 |
| 2,353,655 | Day | July 18, 1944 |
| 2,388,015 | Shoemaker | Oct. 30, 1945 |
| 2,391,412 | Gorton | Dec. 25, 1945 |
| 2,393,312 | Davenport | Jan. 22, 1946 |
| 2,506,914 | Beeler | May 9, 1950 |
| 2,529,193 | Rueter | Nov. 7, 1950 |

FOREIGN PATENTS

| Number | Country | Date |
|---|---|---|
| 555,206 | France | Mar. 17, 1923 |